("12") United States Patent  
Dragoset, Jr. et al.

(10) Patent No.: US 9,110,191 B2
(45) Date of Patent: Aug. 18, 2015

(54) MULTIPLE ATTENUATION FOR OCEAN-BOTTOM SEISMIC DATA

(75) Inventors: William Henry Dragoset, Jr., Houston, TX (US); Alan Gaither Teague, Houston, TX (US); Philip Kitchenside, Orpington (GB)

(73) Assignee: WesternGeco L.L.C., Houston, TX (US)

( * ) Notice: Subject to any disclaimer, the term of this patent is extended or adjusted under 35 U.S.C. 154(b) by 709 days.

(21) Appl. No.: 12/612,784

(22) Filed: Nov. 5, 2009

(65) Prior Publication Data

US 2010/0246324 A1 Sep. 30, 2010

Related U.S. Application Data

(60) Provisional application No. 61/164,794, filed on Mar. 30, 2009.

(51) Int. Cl.
*G01V 1/38* (2006.01)
*G01V 1/36* (2006.01)

(52) U.S. Cl.
CPC ... *G01V 1/36* (2013.01); *G01V 1/38* (2013.01); *G01V 2210/56* (2013.01)

(58) Field of Classification Search
CPC ........ G01V 1/36; G01V 1/38; G01V 2210/56
USPC .......... 181/108, 111, 112; 367/21, 24, 38, 46, 367/54; 702/14, 16; 703/10
See application file for complete search history.

(56) References Cited

U.S. PATENT DOCUMENTS

| | | | |
|---|---|---|---|
| 5,010,976 A * | 4/1991 | Airhart | 181/108 |
| 5,621,700 A | 4/1997 | Moldoveanu | |
| 6,101,448 A | 8/2000 | Ikelle et al. | |
| 6,735,527 B1 * | 5/2004 | Levin | 702/14 |
| 7,123,543 B2 * | 10/2006 | Vaage et al. | 367/24 |
| 2005/0013194 A1 | 1/2005 | Vaage et al. | |
| 2006/0227660 A1 * | 10/2006 | Grion | 367/24 |
| 2007/0214663 A1 | 9/2007 | Pica | |
| 2008/0162051 A1 | 7/2008 | Ikelle | |
| 2009/0016158 A1 | 1/2009 | Gratacos | |
| 2009/0040871 A1 | 2/2009 | Morley | |
| 2009/0048784 A1 | 2/2009 | Matson et al. | |

FOREIGN PATENT DOCUMENTS

| | | |
|---|---|---|
| EP | 0515188 | 11/1992 |
| EP | 2189818 | 5/2010 |
| GB | 2441344 A * | 3/2008 |
| WO | 2008076191 | 6/2008 |

OTHER PUBLICATIONS

Wiggins, "Multiple attenuation by explicit wave extrapolation to an interpreted horizon," The Leading Edge, Jan. 1999, pp. 46-54.*
Kinneging et al., "Efficient 2D and 3D Shot Record Redatuming," Geophysical Prospecting 37, 493-530, 1989.*

(Continued)

*Primary Examiner* — Daniel L Murphy
(74) *Attorney, Agent, or Firm* — Abimbola Bukoye

(57) ABSTRACT

Multiple Modeling, wherein the wavefield is separated into up/down wavefield on either source-side or receiver-side; wherein WEMM is used to extrapolate and predict multiples, which are attenuated from OBC seismic data.

11 Claims, 5 Drawing Sheets

(56) References Cited

OTHER PUBLICATIONS

Jakubowicz, "Wave equation prediction and removal of interbed multiples," EAGE 60th Conference and Technical Exhibition, Jun. 1998., 4 pp.*

Pica, et al., 3D Surface-Related Multiple Modeling, Principles and Results, SEG Annual Meeting, 2005, pp. 2080-2083.

Stork, et al., Predicting and Removing Complex 3D Surface Multiples with WEM Modeling—an Alternatice to 3D SRME for Wide Azimuth Surveys?, SEG Annual Meeting, 2006, pp. 2679-2683.

Pica, et al, Using and Removing 3D Surface-Related Multiples from OBS Data, EAGE 68th Conference and Exhibition, Jun. 2005.

International Search Report, Sep. 28, 2010, PCT/US2010/204648.

Extended European Search Report of European Application No. 10762027.0 dated Nov. 27, 2013: pp. 1-4.

Weglein, "Multiple attenuation: an overview of recent advances and the road ahead (1999)," The Leading Edge, Jan. 1999: pp. 40-44.

* cited by examiner

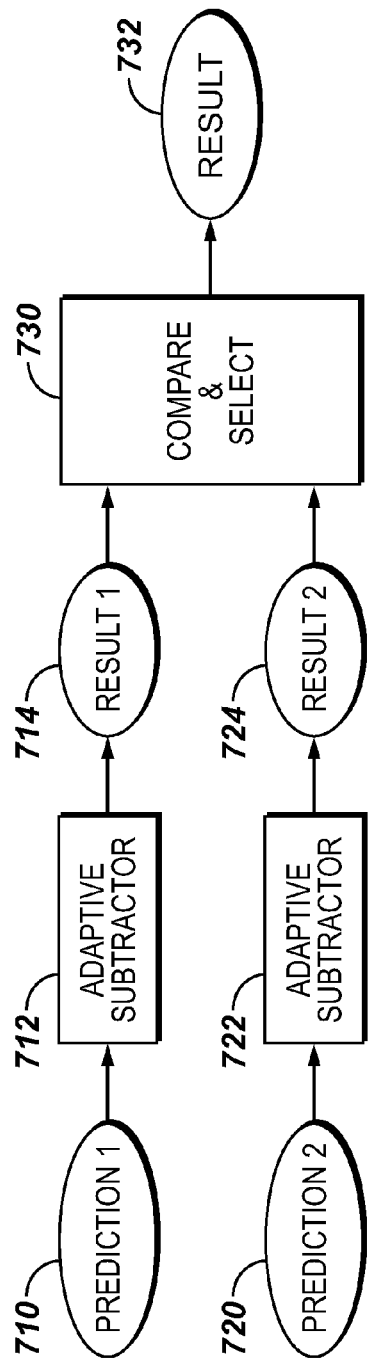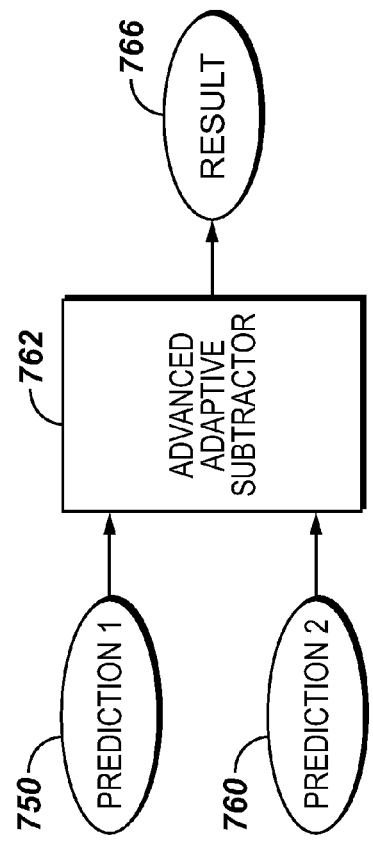

MULTIPLE ATTENUATION FOR OCEAN-BOTTOM SEISMIC DATA

The present application claims priority under 35 U.S.C. §119(e) to U.S. Provisional Application Ser. No. 61/164,794 filed on 30 Mar. 2009, with the same title and by the same inventors.

BACKGROUND

1. Field of the Invention

Embodiments of the present invention relate to geophysical surveys, methods of processing seismic data, and, in particular, to use Wavefield Extrapolation Multiple Modeling (WEMM) to predict multiples for seismic data recorded by dual sensors on the ocean bottom cables, so as to attenuate multiples.

2. Description of the Related Art

The following descriptions and examples do not constitute an admission as prior art by virtue of their inclusion within this section.

Seismic surveying is a method for determining the structure of subterranean formations in the earth. Seismic surveying may typically utilize seismic energy sources which generate seismic waves and seismic receivers which detect seismic waves. The seismic waves may propagate into the formations in the earth, where a portion of the waves may reflect from interfaces between subterranean formations. The seismic receivers may detect the reflected seismic waves and convert the reflected waves into representative electrical data. The seismic data may be transmitted by electrical, optical, radio or other means to devices which record the data. Through analysis of the recorded seismic data (or seismograms), the shape, position and composition of the subterranean formations may be determined. This is mostly used to indicate the presence or absence of probable locations of hydrocarbon deposits.

Marine seismic surveying is a method for determining the structure of subterranean formations underlying bodies of water. Marine seismic surveying may typically utilize seismic energy sources and seismic receivers located in the water which may be either towed behind a vessel or positioned on the water bottom from a vessel. The energy source may typically be an explosive device or compressed air system which generates seismic energy, which then propagates as seismic waves through the body of water and into the earth formations below the bottom of the water.

A seismic wave travels from a source, reflected once by an interface of subsurface formations and received by a receiver, is a primary (P). The signal it generates is the desired primary signal. A seismic wave may also travel through other routes, be reflected multiple times at various interfaces before reaching a receiver. These waves generate multiples. Depending on which additional interfaces reflect the seismic wave, the multiples may be called Surface related multiples, internal multiples etc. Except the primary signal, all signals (mostly multiples) generated at the receivers by other waves are considered noises and need to be removed from the recorded data.

Various methods have been developed to attenuate multiple reflections in seismic data. For example, Surface Related Multiple Elimination (SRME) is a process that predicts surface multiples by stacking convolved pairs of recorded seismograms and adaptively subtracting the predicted multiples from the recorded seismograms to remove surface multiples. However, application of SRME may require awareness of several possible problems. Two potential problems in using SRME are properly handling ghosts and properly predicting sea surface reflection effects.

Some have proposed the use of WEMM to predict the surface multiples that appear in marine streamer seismic data. Because Ocean Bottom Cable survey is quite different comparing to the towed streamer seismic survey, those methods applicable to towed streamer data are not directly applicable to OBC data. There are at least two major differences between streamer surveys and ocean-bottom cable (OBC) surveys. Firstly, in OBC the wavefield sensors are located on the ocean bottom, while the sources are usually in water body at a different depth. In OBC survey, sources and receivers are at different depth, unlike in towed streamer survey, the sources and streamers are at almost the same depth. Secondly, two types of sensors (pressure measurement, e.g. hydrophones and displacement measurement, e.g. geophones) are typically used in OBC as compared to the standard single sensor type (hydrophones) used in streamers. To account for and take advantage of these differences, OBC data typically require different methodology.

One method for OBC data is considered in the Pica, et al., (2006) reference. The method assumes that the sources are located at the sea surface and that the up-going wavefield at the ocean bottom is available. Reciprocity is invoked and the data are sorted into common-receiver gathers. This approach allows the method for marine streamer data to be used. In other words multiples are predicted by extrapolating the wavefield from the sea surface through one traverse of the subsurface.

Here are some references discussing WEMM:

Pica A., G. Poulain, B. David, M. Magesan, S. Baldock, T. Weisser, P. Hugonnet, and P. Herrmann, 2005, 3D surface-related multiple modeling, principles and results: 75th Annual International Meeting, SEG, Expanded Abstracts, 2080-2083.

Stork, C., Kapoor, J., Zhao, W., Dragoset, B., and Dingwall, K., 2006, Predicting and removing complex 3D surface multiples with WEM modeling—an alternative to 3D SRME for wide azimuth surveys?: SEG Expanded abstract.

Pica, A., Manin, M., Granger, P. Y., Marin, D., Suaudeau, E., David, B., Poulain, G. and Hermann, P. H., 2006, Using and Removing 3D Surface-Related Multiples from OBS data. (proceedings of EAGE Workshop).

There is still a need for a proper method to attenuate multiples in OBC surveys. The present invention is directed to overcoming, or at least reducing the effects of, one or more of the problems set forth above.

SUMMARY

A few methods for attenuating multiple reflections using Wavefield Extrapolation Multiple Modeling (WEMM) are described here. In some methods, the wavefield is separated into up/down wavefield on the source-side, the receiver-side or both; and WEMM is used to extrapolate and predict multiples, which are attenuated from OBC seismic data.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

FIGS. 7A and 7B illustrate two flow diagrams of embodiments of the invention.

Figure 1:
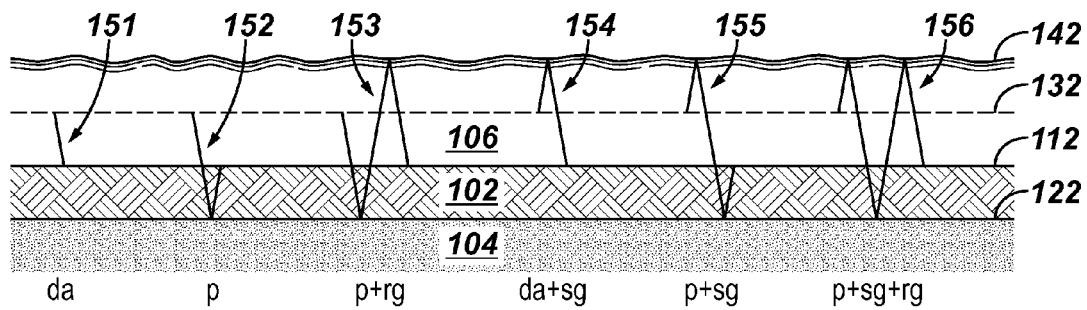
FIG. 1 illustrates ray paths of a simple Ocean Bottom Cable survey.
Figure 1:
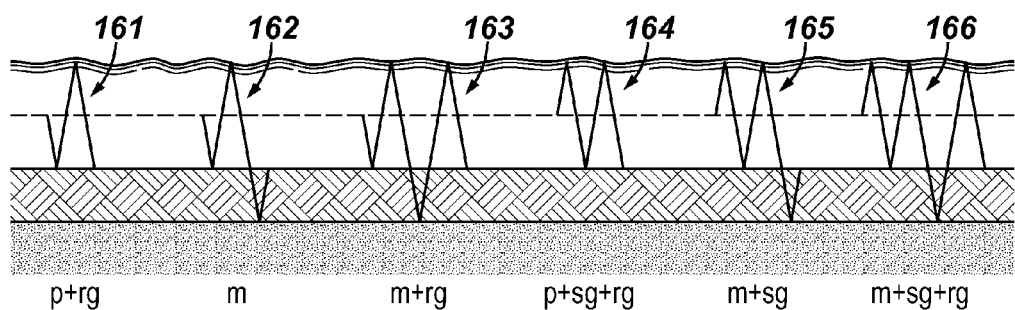
Figure 1:
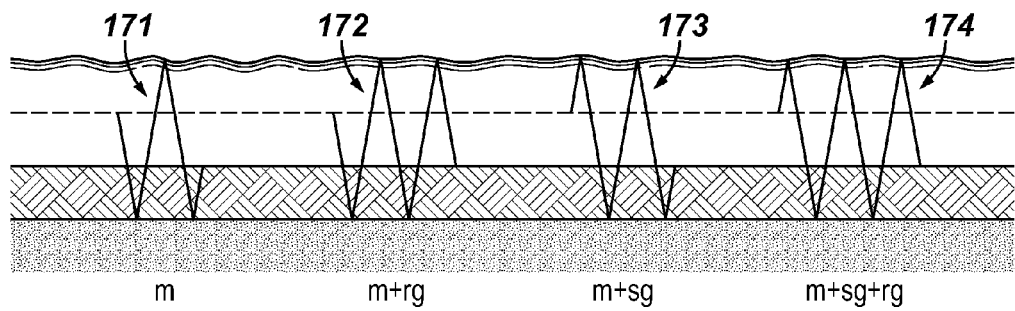

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs generally describe one or more implementations of various techniques directed to a method for attenuating surface multiple reflections in dual-wavefield seismic data.

FIG. 1 illustrates a diagrammatic view of ray paths of OBC seismic surveying in connection with implementations of various techniques described herein. Subterranean formations to be explored, such as formations 102 and 104 (for simplicity, only two are shown and discussed), lie below a body of water 106. Seismic energy sources (not shown) are located at depth 132 in water 106 below sea surface 142 and above sea floor 112. Seismic receivers (not shown) are positioned on sea floor 112. A seismic source, such as an air gun, creates seismic waves in the body of water 106 and a portion of the seismic waves travels downward through the water toward the subterranean formations 102 and 104 beneath the body of water 106. When the seismic waves reach a reflector or interface, a portion of the seismic waves reflects upward and a portion of the seismic waves continues downward. The seismic reflector can be the water bottom (sea floor) 112 or one of the interfaces between two subterranean formations, such as interface 122 between formations 102 and 104. When the reflected waves traveling upward reach the water/air interface at the water surface 142, a majority portion of the waves reflects downward again. Continuing in this fashion, seismic waves can be reflected multiple times between upward reflectors, such as the water bottom 112 or formation interfaces below, and the downward reflector at the water surface 142 above. Each time the reflected waves propagate past the position of a seismic receiver, the receiver senses the reflected waves and generates representative signals. Depending on the ray paths the wave travels, the waves may be grouped into several types.

A wave that travels from a source directly to a receiver is referred to as direct arrival 151 (*da*). Seismic waves which have reflected only once, from an interface between subterranean formations, e.g. reflector 122, before being detected by a seismic receiver are referred to as primaries (p) 152. Primary reflections contain the desired information about the subterranean formations which is the goal of marine seismic surveying. Other waves, such as multiples, need to be attenuated from the recorded seismic data, in order to isolate the desired primaries.

In standard, unprocessed marine seismic streamer data, each reflection, whether a primary reflection or a multiple reflection, may consist of four events, a ghost-free event, a source ghost event (sg), a receiver ghost event (rg) and a combined source and receiver ghost event. FIG. 1 illustrates all possible first order multiples and the combination of the four events. They include:

151 direct arrival (da),
152 primary (p), which is the desired signal,
153 primary plus receiver side ghost (p+rg),
154 direct arrival plus source side ghost (da+sg),
155 primary plus source side ghost (p+sg),
156 primary plus both source and receiver side ghosts (p+sg+rg),
161 primary plus receiver side ghost (p+rg),
162 multiple (m),
163 multiple plus receiver side ghost (m+rg),
164 primary plus both source and receiver side ghosts (p+sg+rg),
165 multiple plus source side ghost (m+sg),
166 multiple plus both source and receiver side ghosts (m+sg+rg),
171 multiple (m),
172 multiple plus receiver side ghost (m+rg),
173 multiple plus source side ghost (m+sg), and
174 multiple plus both source and receiver side ghosts (m+sg+rg).

Although seismic events are described herein as raypaths, it should be understood that seismic events are wavefield phenomena. Those having common knowledge in the art will recognize the equivalence and relationship of the raypath description to the underlying wavefield physics.

A goal of seismic data processing is to enhance primary reflections 152, which may then be interpreted as subsurface interfaces. Multiple reflections, among other reflections, may be noise which obscures the desired primary reflection signal. Seismic data processing may be used to attenuate multiple reflections in seismic data.

Figure 2:
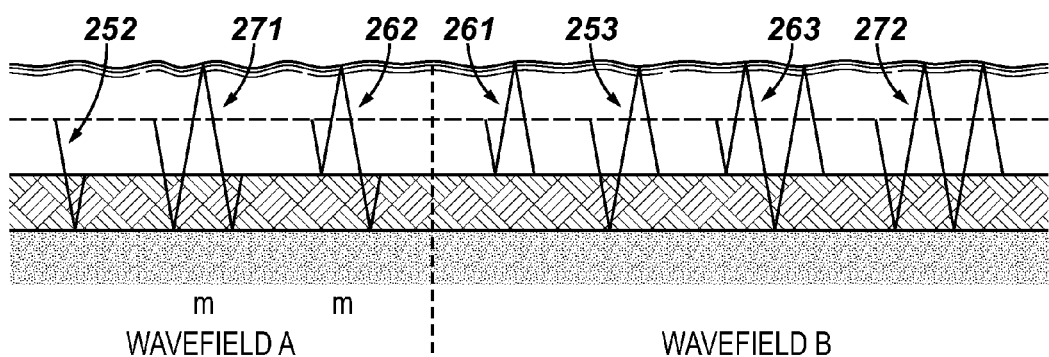
FIGS. 2 and 3 illustrate ray paths used in an embodiment of the invention where common source wavefield is extrapolated.

The various events in FIG. 2 can be divided into two classes: those that are traveling upward when they encounter the sensors at the ocean bottom and those that are traveling downward when they encounter the sensors. Because "p" is in the upcoming class, one method of eliminating about half of the undesirable noise is to perform a procedure called up-down wavefield separation and then discard the down-coming wavefield. This is common practice in OBC data processing and is enabled by recording both the pressure and the vertical velocity of the wavefield at the ocean bottom. Other combinations of dual-sensor or multiple-sensor measurements are also possible and provide the similar capability. For example, the OBC may have sensors to measure pressure and the derivative of pressure at the sensor locations; or the sensors may measure 3D particle motions of the seafloor at the sensor locations. However, up-down separation may solve only half the problem. The methods described below try to solve the other half of the problem.

Method 1—Common Source Wavefield Extrapolation

In one of the embodiments of the current invention, the common source wavefield is extrapolated. The multiples are modeled and predicted with WEMM. The first three steps include:

1) source deghosting (a well-known procedure),
2) up-down wavefield separation, and
3) direct arrival muting.

In Step 1, all source related ghost waves are removed, such as 154, 155, 156, 164, 165, 166, 173 and 174. This step is to separate the wavefield on the source side into two parts: up-going part and down-coming part. The source side up-going part form the source related ghost waves, so they are removed. Only the down-going wavefield will generate the primary signal and is preserved for subsequent steps. In Step 2, the wavefield are separated into up-going fields and down-coming fields on the receiver side, as shown in FIG. 2 except the direct arrival. Step 3 removes the direct arrival. The resulting upcoming wavefield A (252, 262 and 271) and down-coming wavefield B (261, 253, 263 and 272) are now available.

As shown in FIG. 2, the raypaths include:

252 primary (p),
262 and 271 multiples (m),
261 primary plus receiver side ghost (p+rg),
253 primary plus receiver side ghost (p+rg),
263 multiple plus receiver side ghost (m+rg), and
272 multiple plus receiver side ghost (m+rg).

Figure 3:
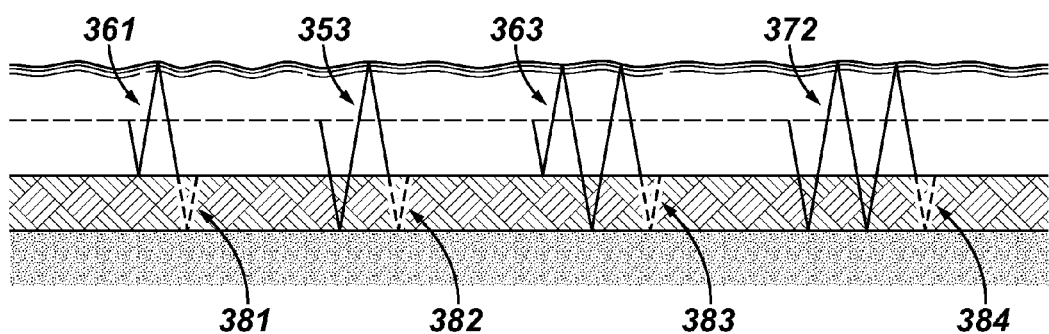

Step 4 in Method 1 is to use WEMM to extrapolate down-coming wavefield B through one round trip in the subsurface, as shown in FIG. 3, raypaths 381, 382, 383 and 384 (in dashed-lines). Raypaths 361 and 353 are first order multiples while raypaths 363 and 372 are second order multiples. This step is performed in the common-shot domain, since the receiver side of the wavefield is being extrapolated. Comparing the extrapolated wavefield as in FIG. 3 and the up-going wavefield A in FIG. 2, the main difference is the primary 252. The first order multiples 271 and 262 in FIG. 2 are the same as the first order multiples 363 and 353 in FIG. 3. FIG. 3 has additional wavefield 363 and 372, but they are of second order. These events, and other higher order multiples, are also present in the procedure to get wavefield A as shown in FIG. 2. They are not shown for simplicity. Adaptively subtracting the result of step 4 as in FIG. 3, from upcoming wavefields as in FIG. 2, then only one event remains, i.e. the desired signal 252 "p," the primary. All higher order multiples, although not shown in the figures and not discussed in details here, are also removed. In this method, the down-coming wavefield is not discarded as is the standard practice in OBC data processing.

A possible disadvantage of Method 1 is that the downward wavefield extrapolation starts at the ocean bottom. Since this "horizon" is not necessarily flat, it means that either the extrapolation algorithm must be designed to accommodate that possibility, or that a redatuming of the data to a flat horizon is performed prior to extrapolation.

Method 2—Common Receiver Wavefield Extrapolation

Method 2 differs from Method 1 in that the wavefield extrapolation occurs on the source side, and, hence, is applied in the common receiver domain. Because the source is positioned within the water layer, the issue of a non-flat starting horizon for the wavefield extrapolation does not arise, as it does in Method 1.

Figure 4:
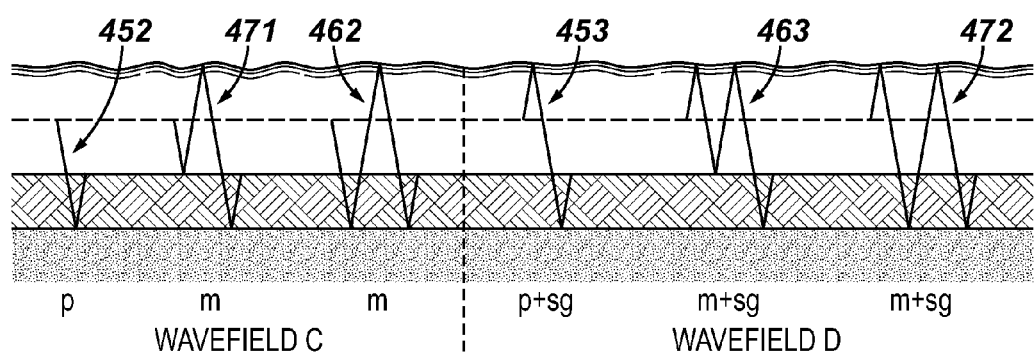
FIGS. 4 and 5 illustrate ray paths used in an embodiment of the invention where common receiver wavefield is extrapolated.

Step 1 is receiver-side up/down wavefield separation. The down-coming part is ignored and only the up-going part is used. This step eliminates the raypaths that have down-coming parts, such as 153, 154, 156, 161, 163, 164, 166, 172 and 174 as shown in FIG. 1. Only the up-going raypath remains as shown in FIG. 4. In Step 2, source side up/down wavefield separation is done. It may also be known as source de-ghosting. It is noted that the up/down wavefield referred here may differ depending whether the wavefield is on the receiver side or on the source side. The result from these two steps are shown in FIG. 4, where we have the source-side down-coming wavefield C containing 452 (*p*), 471 (*m*) and 462 (*m*); the source-side up-going wavefield D containing 453 (p+sg), 463 (m+sg) and 473 (m+sg).

Step 2 source deghosting may be done in several different ways. It can be done by using over/under sources in the acquisition. An alternative to over/under sources is to perform deterministic source deghosting followed by application of WEMM starting at the source level and propagating up to the surface and then back down to the source level before proceeding with step 4. A third option is to omit step 2. In that case, the extrapolated wavefield—and hence the predicted multiples—include a more complicated wavelet, and the adaptive subtraction step is relied upon to compensate for this.

Figure 5:
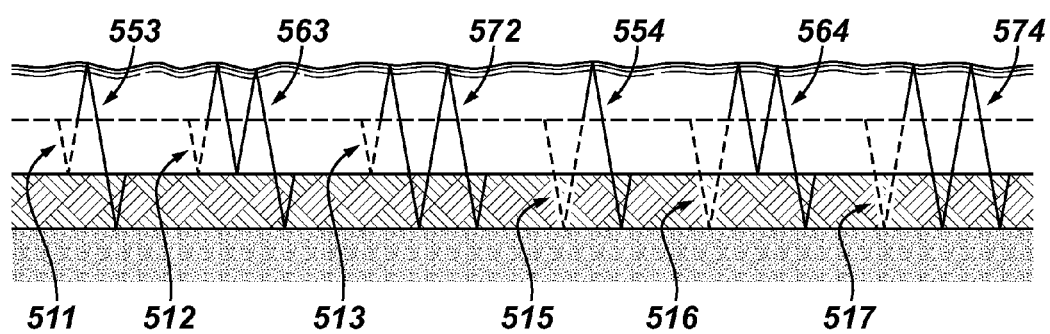

Assuming that Step 2 above has been performed, then the next two steps of Method 2 include: Step 3, sort wavefield D (453, 363 and 472) to common receivers; and Step 4, apply WEMM to wavefield D, which results wavefield as shown in FIG. 5, which contains first order multiples 553 and 554, and second order multiples 563, 564, 572 and 574. The raypaths 511-517 in dashed-lines are the extrapolated raypaths using WEMM. Step 5 is to adaptively subtract wavefield as shown in FIG. 5 from the down-coming wavefield C as in FIG. 4. The only thing left is the primary 452.

In Step 3, the sort to common receivers is used because the wavefield extrapolation is applied to the source side of the wavefield. The final steps are to sort the predicted multiples as in FIG. 5 and wavefield C as in FIG. 4 to a common domain and perform the adaptive subtraction. The final result is the same as that of Method 1, i.e. the primary. All multiples of all orders are removed during the adaptive subtraction.

Method 3—Combined Wavefield Extrapolation

Although either method 1 and 2 is effective independently in predicting multiples and subsequently removing multiples from OBC data, it is found that it is beneficial to combine the methods 1 and 2, such that the multiples can be predicted and eventually removed with less errors. As shown in FIG. 7A, methods 1 produces a multiple prediction 710 and method 2 produced a prediction 720, after methods 1 and 2 are performed on seismic data independently. After independent adaptive subtractions 712 and 722, result 714 from method 1 and result 724 from method 2 are then compared at step 730. The better of the two results is chosen as the final result 732, which is multiple-free processed OBC data.

Alternatively, as shown in FIG. 7B, both sets of predictions 750 and 760 from method 1 and 2 can be adaptively filtered and subtracted simultaneously in Advanced Adaptive Subtractor 762 using any one of many known adaptive subtraction methods. The result out of subtractor 762 is the processed OBC data 766.

When both method 1 and method 2 are used, the various steps in either method may be carried out independently of the steps in the other method (e.g. using parallel processing in two computers), or in sequence in a single computer depending on the availability of processing resources.

For simplicity, only one layer below the water bottom is shown in the figures and discussed while describing the methods of the current invention. In reality, there are many layers. The number of layers does not affect the application of the methods described above. For a similar reason, to keep the raypath diagrams simple, the figures discussed above were drawn in two dimensions. In practice, the wavefield extrapolation steps can be either 2D or 3D operations. The up/down separation steps may be performed in either a 2D or a 3D fashion.

Once the multiple-free processed OBC seismic data are obtained, they can be used to facilitate the geophysical exploration. The processed data may indicate the subsurface geophysical structures in the surveyed area, for example hydrocarbon bearing depositories or structures bearing other valuable substances. The processed data may also indicate the non-existence of such valuable substances, in which case, further exploration expenses may be avoided.

As with most inventions, there are many variations on the methods illustrated here that are obvious to one familiar with the art.

Figure 6:
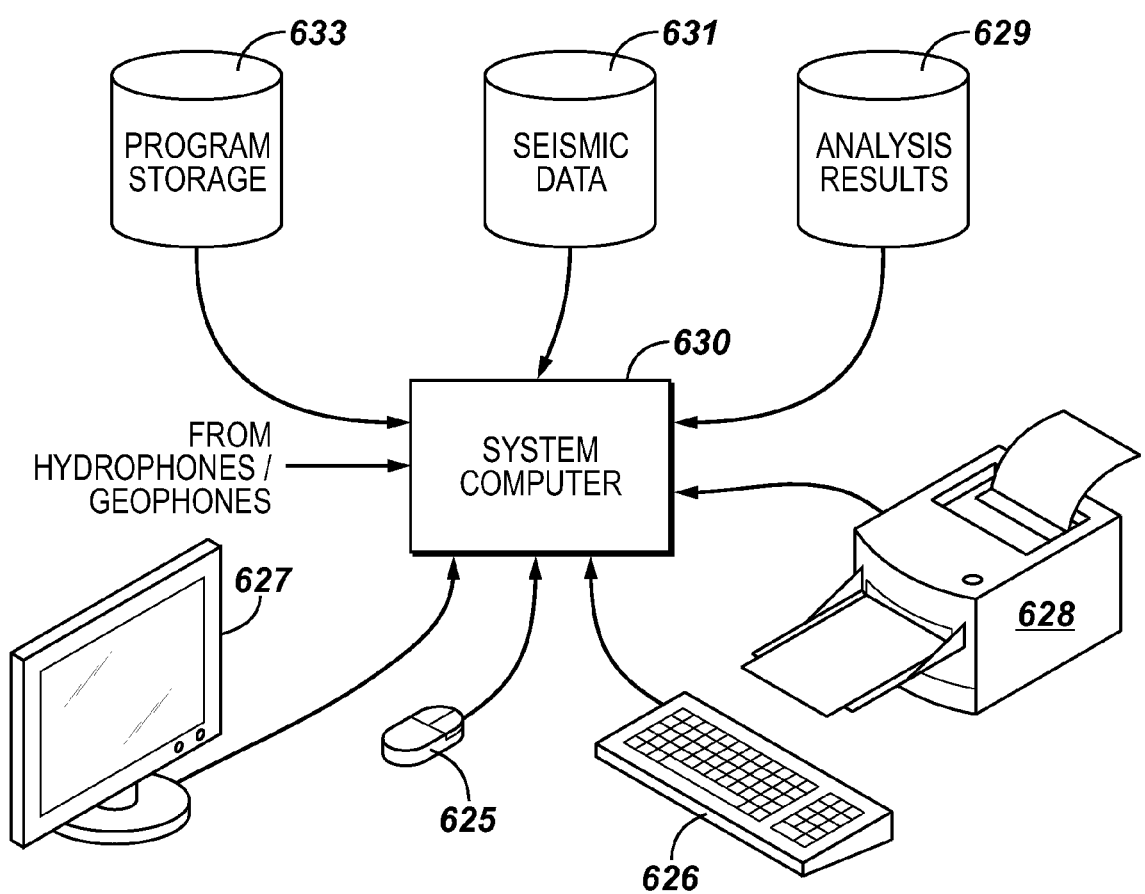
FIG. 6 illustrates a computer system implementing the methods of the invention.

FIG. 6 illustrates a computing system 600, into which implementations of various techniques described herein may be implemented. The computing system 600 may include one or more system computers 630, which may be implemented as any conventional personal computer or server. However, those skilled in the art will appreciate that implementations of various techniques described herein may be practiced in other computer system configurations, including hypertext transfer protocol (HTTP) servers, hand-held devices, multiprocessor systems, microprocessor-based or programmable consumer electronics, network PCs, minicomputers, mainframe computers, and the like.

The system computer 630 may be in communication with disk storage devices 629, 631, and 633, which may be external hard disk storage devices. It is contemplated that disk storage devices 629, 631, and 633 are conventional hard disk drives, and as such, will be implemented by way of a local area network or by remote access. Of course, while disk storage devices 629, 631, and 633 are illustrated as separate devices, a single disk storage device may be used to store any and all of the program instructions, measurement data, and results as desired.

In one implementation, seismic data from the receivers may be stored in disk storage device 631. The system computer 630 may retrieve the appropriate data from the disk storage device 631 to process seismic data according to program instructions that correspond to implementations of various techniques described herein. The program instructions may be written in a computer programming language, such as C++, Java and the like. The program instructions may be stored in a computer-readable medium, such as program disk storage device 633. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 630.

In one implementation, the system computer 630 may present output primarily onto graphics display 627, or alternatively via printer 628. The system computer 630 may store the results of the methods described above on disk storage 629, for later use and further analysis. The keyboard 626 and the pointing device (e.g., a mouse, trackball, or the like) 625 may be provided with the system computer 630 to enable interactive operation.

The system computer 630 may be located at a data center remote from the survey region. The system computer 630 may be in communication with the receivers (either directly or via a recording unit, not shown), to receive signals indicative of the reflected seismic energy. These signals, after conventional formatting and other initial processing, may be stored by the system computer 630 as digital data in the disk storage 631 for subsequent retrieval and processing in the manner described above. While FIG. 6 illustrates the disk storage 631 as directly connected to the system computer 630, it is also contemplated that the disk storage device 631 may be accessible through a local area network or by remote access. Furthermore, while disk storage devices 629, 631 are illustrated as separate devices for storing input seismic data and analysis results, the disk storage devices 629, 631 may be implemented within a single disk drive (either together with or separately from program disk storage device 633), or in any other conventional manner as will be fully understood by one of skill in the art having reference to this specification.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
processing seismic data acquired by an ocean bottom cable in a machine to separate a common receiver gather into a first upgoing wavefield and a first downgoing wavefield and discarding the first upgoing wavefield;
processing the seismic data in a machine to separate a common shot gather into a second upgoing wavefield and a second downgoing wavefield;
muting at least one direct arrival in the second downgoing wavefield;
extrapolating the second downgoing wavefield for a round trip through a geologic subsurface to form a prediction of multiples using Wavefield Extrapolation Multiples Modeling (WEMM); and
determining a primary, wherein determining the primary comprises adaptively subtracting the prediction of multiples from the second upgoing wavefield.

2. The method of claim 1, wherein processing the seismic data to separate the common receiver gather comprises:
using seismic data acquired having over-under sources.

3. The method of claim 1, wherein processing the seismic data to separate the common shot gather into the second upgoing wavefield and the second downgoing wavefield comprises an act selected from the group consisting of:
using pressure data and particle motion data; using pressure data and pressure gradient data; and using three-dimensional (3-D) particle motion data.

4. The method of claim 1, further comprising:
transforming the seismic data to correspond to a flat receiver horizon prior to the extrapolation.

5. The method of claim 1, further comprising:
discarding the second downgoing wavefield;
extrapolating the first upgoing wavefield for a round trip on the source side using WEMM;
determining another primary by adaptively subtracting the extrapolated first upgoing wavefield from the first downgoing wavefield
performing adaptive subtraction on the primaries; and
selecting one of the primaries based on the adaptive subtraction.

6. A non-transitory computer-readable storage medium to store computer-executable instructions that when executed by a computer cause the computer to:
process seismic data acquired by an ocean bottom cable to separate a common receiver gather into a first upgoing wavefield and a first downgoing wavefield and discarding the first upgoing wavefield;
process the seismic data to separate a common shot gather into a second upgoing wavefield and a second downgoing wavefield;
mute at least one direct arrival in the second downgoing wavefield;
extrapolate the second downgoing wavefield for a round trip through a geologic subsurface to form a prediction of multiples using Wavefield Extrapolation Multiples Modeling (WEMM); and
determine a primary, the determination comprising adaptively subtracting the prediction of multiples from the second upgoing wavefield.

7. The computer-readable storage medium of claim 6, the storage medium to store instructions that when executed by the computer cause the computer to separate the common receiver gather by:
using seismic data acquired having over-under sources.

8. The computer-readable storage medium of claim 6, the storage medium to store instructions that when executed by the computer cause the computer to separate the common shot gather by performing an act selected from the group consisting of:
using pressure data and particle motion data; using pressure data and pressure gradient data; and using three-dimensional (3-D) particle motion data.

9. The computer-readable storage medium of claim 6, the storage medium to store instructions that when executed by the computer cause the computer to transform the seismic data to correspond to a flat receiver horizon prior to the extrapolation.

10. The computer-readable storage medium of claim 6, the storage medium to store instructions that when executed by the computer cause the computer to:
discard the second downgoing wavefield;
extrapolate the first upgoing wavefield for a round trip on the source side using the WEMM;
determine another primary by adaptively subtracting the extrapolated first upgoing wavefield from the first downgoing wavefield;
perform adaptive subtraction on the primaries; and
select one of the primaries based on the adaptive subtraction.

11. The computer-readable medium of claim 10, the storage medium to store instructions that when executed by the computer cause the computer to determine the primaries simultaneously.

* * * * *